(12) United States Patent
Rakowski

(10) Patent No.: US 6,941,818 B2
(45) Date of Patent: Sep. 13, 2005

(54) EQUIPMENT FOR DISCLOSING PRESSURE

(76) Inventor: Charles Stephen Rakowski, 18 Redditch, Bracknell, Berkshire RG12 0TT (GB)

( * ) Notice: Subject to any disclaimer, the term of this patent is extended or adjusted under 35 U.S.C. 154(b) by 0 days.

(21) Appl. No.: 10/257,452
(22) PCT Filed: Apr. 12, 2001
(86) PCT No.: PCT/GB01/01704
§ 371 (c)(1),
(2), (4) Date: Apr. 18, 2003
(87) PCT Pub. No.: WO01/78851
PCT Pub. Date: Oct. 25, 2001

(65) Prior Publication Data
US 2003/0154903 A1 Aug. 21, 2003

(30) Foreign Application Priority Data
Apr. 13, 2000 (GB) .............................. 0008964

(51) Int. Cl.⁷ .............................................. G01B 21/32
(52) U.S. Cl. ........................................ 73/762; 473/278
(58) Field of Search ................... 73/760–762; 473/278; 349/20, 86; 116/200, 203

(56) References Cited
U.S. PATENT DOCUMENTS 5,223,958 A * 6/1993 Berry .......................... 349/20
5,394,824 A    3/1995 Johnson
5,597,361 A * 1/1997 Hope .......................... 473/237
5,805,245 A * 9/1998 Davis ........................... 349/20
5,841,285 A * 11/1998 Bailey ......................... 324/435
5,925,480 A * 7/1999 Shacklett et al. .............. 429/93

FOREIGN PATENT DOCUMENTS

BE    1006121    5/1994
DE    4100434    7/1992
WO    WO 94/28982    12/1994

* cited by examiner

Primary Examiner—Edward Lefkowitz
Assistant Examiner—Alandra Ellington
(74) Attorney, Agent, or Firm—Law Offices of Royal W. Craig

(57) ABSTRACT

The invention relates to equipment such as for detecting and providing visual confirmation of pressure thereon, e.g. from an impact, which comprises an article having a sandwich construction with a pressure-disclosing layer (3) comprising a liquid crystal, thermochromic material, and a temperature differential layer (5), separated by a layer (4) providing a compressible mechanical shield between the pressure-disclosing layer and the temperature-differential layer. Material according to the invention can be employed to indicate the boundaries of a tennis court, or sports playing areas, or as a golf training aid, among other uses.

15 Claims, 2 Drawing Sheets

EQUIPMENT FOR DISCLOSING PRESSURE

BACKGROUND OF THE INVENTION

1. Field of the Invention

This invention relates to equipment for disclosing pressure, and particularly to sports equipment capable of detecting and providing a temporary indication of pressure, such as that which would result from an impact upon that equipment.

2. Description of the Background

It is a common cause of disagreement between tennis players, often vehemently expressed in professional tennis, as to whether a ball fell within or without the boundaries of the court or the service area. There are means of detecting a ball landing outside the service area, but they are not infallible.

There are a number of faults which cannot be detected, for instance:
- a foot fault during service,
- a ball landing on the service line, including the center service line, and
- a ball landing in or out of play.

There are, in addition, a number of other sports where disagreement can arise, for instance, whether a footballer (association, rugby union, rugby league or American) has or has not put a foot in touch when playing the ball. There is consequently a need for a means of providing visual confirmation as to whether or not a ball has landed on the demarcation lines of a court for racket sports, or the boundary of a sports field. There are other applications as well where a visual indication of pressure, whether from a sudden impact or from a gentler surface to surface contact, would be useful.

WO 94/28982 discloses a device comprising a sandwich of material that is able to adhere to the face of a golf club, and provides an indication of the position of the impact of the face upon a ball. The sandwich comprises an outer impact layer and an inner adhesive layer, between which is a layer of thermnochromic material, such as a liquid crystal material.

A similar device is disclosed in US-A-5805245, but has two or more layers of thermochromic material that change color in different temperature ranges.

DE-A-4100434 discloses a material for marking lines or boundaries on sports fields or courts. An impact is disclosed by means of a liquid crystal material, employing a variety of direct or indirect means, but no detail is given as to how these means can operate.

SUMMARY OF THE INVENTION

According to the present invention, there is provided equipment for detecting and providing visual confirmation of an impact thereon, or of a pressure differential, which comprises an article having a sandwich construction with a pressure-disclosing layer comprising a liquid crystal, or other thermochromic material, and a temperature-differential layer, separated by a layer providing a compressible mechanical shield between the pressure-disclosing layer and the heat emitting layer.

In a preferred embodiment of the invention, a protective layer can be provided above the pressure-disclosing layer and preferably, a stabilization layer is provided between the protective layer and the pressure-disclosing layer.

In a further embodiment of the invention, there is provided a support layer, below the temperature-differential layer. This support layer can be provided with an adhesive layer, or with mechanical anchoring points, so as to be located on the playing surface.

BRIEF DESCRIPTION OF THE DRAWINGS

The present Invention will be further illustrated with reference to the accompanying drawings, in which.

DETAILED DESCRIPTION OF THE PREFERRED EMBODIMENTS

Figure 1:
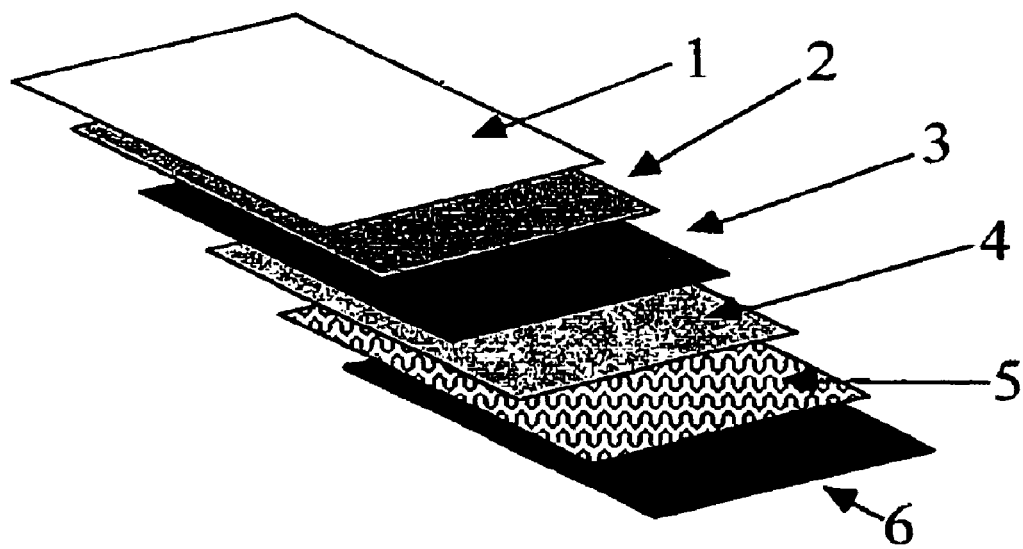
FIG. 1 represents a sample of the material in accordance with the invention.

Referring to FIG. 1, it will be seen that it comprises a number of layers, constituting a sandwich of material. In the preferred form there is a protective coating layer 1, a stabilization layer 2, a layer 3 in which impact is displayed through a color change, a compressible layer 4, a heating layer 5 and a support layer 6.

The device is based on the pressure-disclosing layer 3 that provides an indication of immediate temperature by means of a change in color, the colors being variable according to the temperature range required. The device integrates the liquid crystal membrane with a substrate that provides a temperature differential from ambient appropriate to the specific application for which the equipment is to be used. When equipment according to the invention is subject to external pressure, such as by mechanical impact, that pressure is manifested by a telltale mark of a different color. By adjusting the temperature differential between that of the equipment and ambient temperature, the visual indication of the mark on the surface can be made to remain visible for extended periods.

After an established time lapse, the indicator membrane returns to its original color.

The protective coating 1 is a waterproof layer, e.g. formed from a suitable plastics material, such as polyurethane or polyvinyl chloride, to provide ultra-violet stabilization, thermal protection, and high mechanical strength. It may for example preferably have a thickness from 150 to 400 $\mu$m. It can, if desired, be provided with a surface texture to match that of tile playing surface line.

Where the appearance or texture of grass is required, layer 1 may be supplemented by the application of a layer of sprayed adhesive followed by the spraying of plastic fibers, electrostatically charged, for instance, 2 to 6 mm in length. These fibers will be colored or clear, as appropriate. This layer will vary according to application.

In a preferred embodiment, a clear stabilization layer 2, preferably of polyvinyl chloride is located between layers 1 and 3. The purpose of this layer is to provide a stable substrate for the application of layer 3. Preferably the layer will be comprised of a polyvinyl chloride film, 100 to 150 $\mu$m thick, glass clear and ultra-violet (UV) stabilized. The plastics material will incorporate a sufficient quantity of plasticizer to ensure ductility in operation but with high elasticity, enabling a rapid return to the ground state. Pressure-disclosing layer 3 comprises a liquid crystal layer which can be sprayed or screen printed onto the bottom of layer 2. The thickness of layer 3 is preferably approximately 50 to 100 $\mu$m.

This is an existing commercial product, used in its simplest application as a thermometer. The indicator crystals are supplied in a suspended solution, dissolved in a solvent which volatilizes following application, leaving an even distribution across any surface, while remaining reactive to any temperature differential. The color and temperature differential range can be tuned for appropriate applications.

The chemical formula of the indicator medium can also be adjusted to change the response time and "relaxation" time of the color change. This liquid is known for being screen printed onto cotton T-shirts to show color change, triggered by changes in the wearer's skin temperature.

Layer 4 is a compressible membrane providing a mechanical shield between pressure disclosing layer 3 and heating layer 5 below. It comprises a material having high thermal conductivity. The function is to translate the temperature differential, provided below the layer from the heating layer, into the remnant of a physical impact from above the layer.

The nature and thickness of the material of this layer is dependent on its intended application, e.g. it can be carbon impregnated polyvinyl chloride film e.g. of 300 $\mu$m thickness. Its elasticity can be modified by addition of a plasticizer to affect its coefficient of restitution, in order to regulate 'bounce' characteristics and refresh rate of remnant impact impression and/or to transmit heat from the heating layer 5 to layer 3. Surface texture can, for example, comprise a myriad of point locations created by embossing material with pattern or producing a coarse weave, e.g. of 30 to 50 mesh per cm, using polyvinyl chloride filament. Another method by which this layer may be formed is by deposition of sintered spheres directly on the surface of layer 5 or on a thin membrane which is then applied to the layer 5. Suitable sintered spheres may, for example, have an average diameter of about 50 $\mu$m, while a membrane, if used, may have a thickness of around 10 $\mu$m. Pressure on the indicator layer will be transferred through to heater layer, through point contact, creating a color change due to localized heat transfer through the layer.

The temperature differential layer 5 can be, for example, a commercially-available low temperature heat tape having a thickness determined according to the intended application, e.g. of 2 mm thickness. It can provide a temperature, depending upon according to the intended applications, from 0° to 100° C. Alternatively, it can be a heat-removal system employing cooling fluids, a chemically-reactive system, etc. Whatever system of heating or cooling is employed, an appropriate temperature-differential to ambient can be applied to the liquid crystal membrane to realize an appropriate color-sensitivity range. Impact will be registered by an almost instantaneous change in temperature, producing a visible indication of contact with the equipment, followed by a controlled restitution time during which a remnant contact mark will remain visible. The temperature differential can be powered actively, by means of a transformer or low maintenance batteries, or passively, by natural air contact, solar panels, chemical reaction, etc. Low cost commercial heater tapes are already available for maintaining temperature in e.g. equipment enclosures, fluid conduits, etc. One example of such tape is supplied by Electrothermal Limited, Leigh-on Sea, Essex.

The support layer 6 provides mechanical support and strength, and insulation from the heat-emitting layer 5. It may have a thickness of e.g. 500 $\mu$m. Hard wearing, heavy duty material (e.g. canvas, polyvinyl chloride, polyurethane, u-polyvinyl chloride). It may be provided with adhesive, Velcro™ or mechanical fixing points (e.g. "eye" points) to locate on surface.

Figure 2:
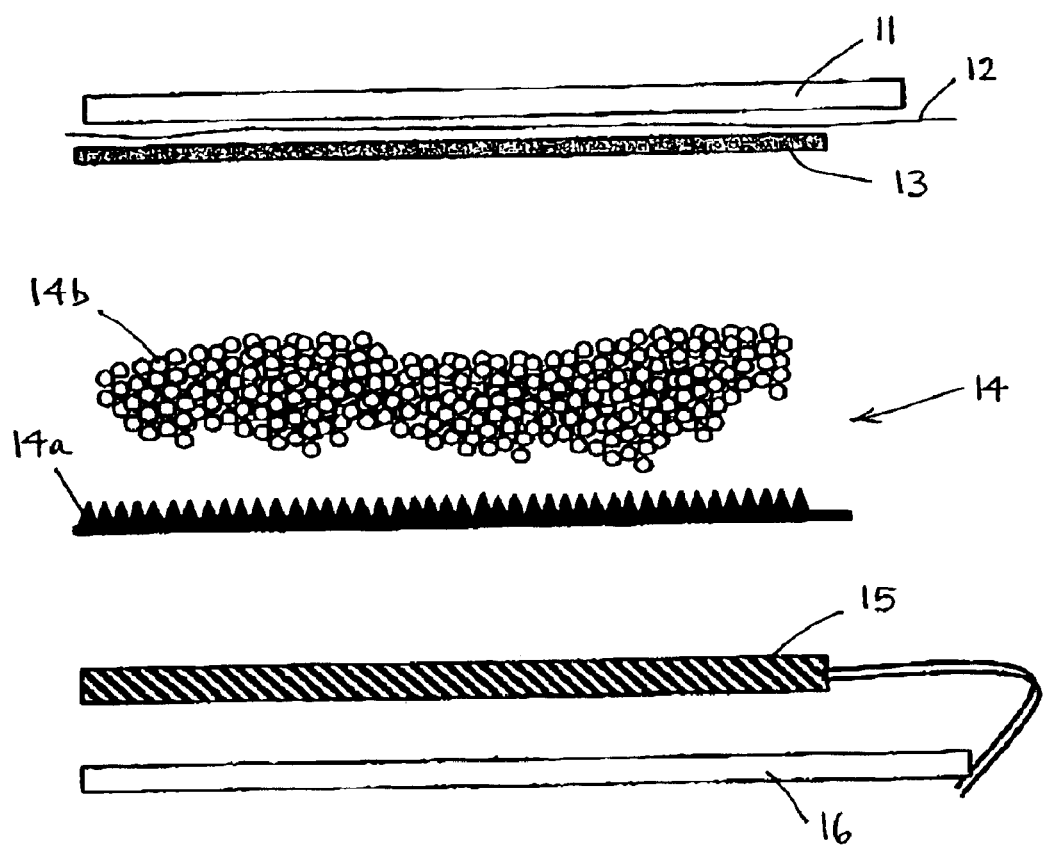
FIG. 2 represents, on a larger scale, an exploded view of a further embodiment of the invention.

In FIG. 2, the equipment comprises a protective layer 11, an optional second protective layer 12, a coloration layer 13, an optional heat-transmitting layer 14, a temperature-differential generating layer 15, and a base-protecting layer 16.

The protective layer 11 may by formed from any suitable plastics material that preferably offers the required qualities of transparency or translucency (for observability of the color change), stability against the effects of UV radiation, chemicals or such environmental effects as rainfall, and mechanical strength (to ensure adequate durability). Various polymeric materials, such as polyurethane, polyvinyl chloride, polycarbonates, and latex polymers are known to provide such properties.

In general, it may have a thickness from 150–400 $\mu$m, and may be a continuously extruded or deposited layer or have a woven or knitted construction providing a surface which may be smooth or textured, simulating turf or short grass, the surface finish being consistent with the playing surface of the applicable sport, the coefficient of friction being dependent upon the particular application. The optional second protective layer 12 is a clear layer between layer 11 and the coloration layer 13. It should be glass clear and UV stabilized, the materials employed being generally chosen from the same materials as layer 11, but layer 12 will be of lesser thickness, e.g. from 100–150 $\mu$m.

In general, layers 11 and 12 may be fixed to the adjacent layers by thermal, radiofrequency, glue or mechanical fixing as desired.

The coloration layer 3 may comprise a liquid crystalline layer applied or adhered to the base of layer 11, or layer 12 if employed, or to the top of the temperature-differential generating layer 15, or the heat transmitting layer 14, if one is employed. It may be applied by spraying, screen printing or the material may be separately encapsulated. Any suitable liquid crystal material, such as cholesteric or nematic liquid crystal. Other photochromic materials may be employed, if desired. The color of the material will be dependent upon the intended application. The layer will be generally 50–100 $\mu$m thick to provide a visible solid color, but not to be opaque. If the coloring material is dispersed in a matrix, the material of the matrix should be ductile, of high elasticity and restitution, and mechanically stable, e.g. to creep or cracking.

The layer may be fixed to the adjacent layers by a means of the same type as described above for layers 11 and 12.

The optional heat-transmitting layer 14 may be employed, depending on the intended application of the equipment. It will generally be about 50 $\mu$m thick, of rigid or semi-rigid material, e.g. a plastics material, rubber or an extruded metal, and may be either a continuous layer or a layer of varying thickness, with point or line contact with adjacent layers, e.g. with shaped particles such as pyramids 14a, semi-spheres, or sintered spheres 14b, so as to emphasize the temperature difference between optimum temperature (as a function of color range) and the temperature of the layer below. The shaped articles may be embossed on the layer (as in 14a), a granular layer (as in 14b), or may be formed by producing a coarse weave of an extruded semirigid polyvinyl chloride filament. As an alternative, sintered spheres, e.g. of average diameter about 50 $\mu$m may be deposited on a relatively thin surface, e.g. about 10 $\mu$m thick, or may be deposited directly on layer 15.

The temperature-differential generating layer 15 provides thermal energy to the device from a discrete internal layer or heat may be conducted into the equipment, e.g. by body warmth, depending upon where the equipment is located. In an alternative embodiment, a series of heating and cooling zones are provided, in the form of small tubes through which relatively colder and warmer fluids may be circulated. This can be used to provide a predetermined coloration pattern in layer 13.

The energy source for layer 15 may be any convenient means that will produce a temperature differential from ambient temperature by conduction, convection or radiation. The energy may be stored or generated, e.g. from mains, battery, liquid natural gas, liquid petroleum gas, or butane; passive e.g. from infra-red radiation, active solar heating, body heat (e.g. in prosthetics), exothermic or endothermic chemical reaction, or by evaporative or convection cooling.

The base protection layer 16 acts to separate the equipment from the ground, its mechanical strength will depend on the application. It can be employed to protect the edges of the equipment. The coefficient of the lower surface will be dependent on the intended application, and can be, for instance Velcro™, grippers, spikes, latex or an adhesive. The anchorage method will depend upon the surface to which the equipment is applied. Depending upon the surface suitable methods can be from an adhesive, stakes through eyelets, weights, or the equipment may be sown to a removable substrate for transport. The material of the layer may be chosen for its intended use and may be e.g. wood, a plastics material, or a metal.

If desired the base layer and the upper protective layer may be joined along their edges to encapsulate the layers between them.

One method for manufacturing a tape or mat according to the invention could be as follows:

I. Layer 1 is placed face down.
II. Layer 2 is placed on top of layer 1.
III. Tell-tale reaction layer screen 3 is printed or sprayed on top of layer 2.
IV. Layer 4 is laid on top of layer 3, once stable.
V. The edges of these four layers will be welded e.g. by radiofrequency welding.
VI. Heating or cooling layer 5 is placed on top of consolidated layers.
VII. Final support membrane layer 6 is laid on top, with a final welding along edges, without affecting heater mat.
VIII. Mechanical fixings, Velcro™ or double-sided adhesive may be attached according to application.

Not only can multi-layer material in accordance with the present invention be employed for marking the boundaries of a playing surface, or for dividing the playing surface into different areas, it can also be employed as a training aid in golf. In such an instance, it would be provided in the form of a mat, or at least in the form of an area wider than the extended but narrow shape of the boundary lines of a court for playing racket sports or football.

For the golf training mat application, the base material would have to be dense enough to prevent movement when the mat receives a high velocity impact from the club head. This may be enhanced by the provision of mechanical fixings into the base or floor, carpet, etc. The base also provides mechanical protection for the electrical conduit leading to the heater mat in layer 5.

When a golf ball is hit, it is important that, at the moment of impact, the bottom of the club face should be perpendicular to the intended course of the ball, and should remain so immediately before and after impact. Many players find it extremely difficult to ensure that the moment of impact of the club head with the ball occurs during the appropriate portion of the swing. This is particularly difficult when practicing in a confirmed space such as a net.

A strip of a material according to the invention can therefore constitute a practice or training aid for golf. It will provide an immediate indication of the path of the club head. Immediately before and after impact, the direction of the path will show at once if the players swing is faulty. Both an in-to-out swing (with the club head moving away from the intended track of the ball at the moment of impact) and an out-to-in swing, lead to misdirected shots. The use of the material will therefore enable a player to correct swing faults very easily.

Other potential uses of tape or mats according to the invention can be to delineate out of bounds areas adjacent to the touchlines in American football, or basketball, or to indicate the exact point of impact in shot putting.

Possible non-sporting uses of material according to the invention include:

Use in the form of tape or sheets as an aid in fitting prosthetic limbs, by placing the material between the stump of a limb and the prosthesis to be fitted.

Use in the form of tape or mats (with adhesive backing) in production lines to indicate which surfaces are binding where a free flow is required.

Use in sheet form and applied as a surface covering to models (e.g. boat hulls, aviation or motor models) for testing in a wind tunnel or water tank. The regions of the model where pressure is greatest can be displayed by the difference in color.

Use to identify sources of delay arising from obstructions in production lines, where articles on the production line may come into contact with one another or with boundaries on the line.

The total device is capable of withstanding a broad range of temperature, such as those resulting from solar radiation or autoclaving. It is a simple matter to repair the whole or intermediate layers. It is electrically isolated, and waterproof, and exhibits impact-resistance and puncture resistance. It is chemically stable and durable. Most or all of the components are already existing, and may be obtained from various suppliers.

The various applications of the equipment include:

Bottleneck detection in production engineering; dew detection in sporting arenas; impact detection on artificial cricket pitches; detection of impact in out-of-bounds areas for various racquet sports; surface-to-surface contacts; various scientific uses such as anemometric measurements, measurement of velocity contours in wind tunnels and in hydrodynamic testing of ships or cars; or for advertising (multi-message advertising due to embedded ages in different temperature-sensitive layers).

What is claimed is:

1. Equipment for detecting and providing visual confirmation of an impact thereon or of a pressure differential which comprises an article having a sandwich construction with a pressure-disclosing layer comprising a liquid crystal, or other thermochromic material, and a heat-emitting temperature-differential layer, separated by a layer providing a compressible mechanical shield between the pressure-disclosing layer and the heat-emitting temperature-differential layer, wherein the visual confirmation of the impact or pressure differential appears in the pressure-disclosing layer directly at the point where the impact or pressure differential occurred.

2. Equipment as claimed in claim 1, which further comprises a protective layer above the pressure-disclosing layer and a support/base protection layer below the temperature-differential layer.

3. Equipment as claimed in claim 2, further comprising a stabilization layer between the protective layer and the pressure-disclosing layer.

4. Equipment as claimed in claim 1, which further comprises a protective layer above the pressure-disclosing layer and a support/base protection layer below the temperature-differential layer.

5. Equipment as claimed in claim 4, further comprising an adhesive layer below the support/base protection layer.

6. Equipment as claimed in claim 4, wherein the support/base protection layer is provided with anchoring points.

7. Equipment as claimed in claims 1 or 2–6, in the form of a ribbon or tape.

8. Equipment as claimed in claims 1 or 2–6, in the form of a mat or a sheet.

9. Equipment as claimed in any one of the claims 2–6, wherein the edges of the support/base protection layer and the protective layer are joined to encapsulate any intermediate layers.

10. Equipment for detecting and providing visual confirmation of an impact thereon or of a pressure differential which comprises an article having a sandwich construction with a protective layer, a pressure-disclosing layer beneath said protective layer, said pressure disclosing layer further comprising a liquid crystal, or other thermochromic material, a stabilization layer beneath the protective layer, a temperature-differential layer, and a layer providing a compressible mechanical shield between the pressure-disclosing layer and the temperature-differential layer, wherein the visual confirmation of the impact or pressure differential appears in the pressure-disclosing layer directly at the point where the impact or pressure differential occurred.

11. Equipment for detecting and providing visual confirmation of an impact thereon or of a pressure differential which comprises an article having a sandwich construction with a pressure-disclosing layer comprising a liquid crystal, or other thermochromic material, a temperature-differential layer, separated by a layer providing a compressible mechanical shield between the pressure-disclosing layer and the temperature-differential layer, a support/base protection layer below the temperature-differential layer, and an adhesive layer below the support/base protection layer, wherein the visual confirmation of the impact or pressure differential appears in the pressure-disclosing layer directly at the point where the impact or pressure differential occurred.

12. Equipment for detecting and providing visual confirmation of an impact thereon or of a pressure differential which comprises an article having a sandwich construction with a pressure-disclosing layer comprising a liquid crystal, or other thermochromic material, a temperature-differential layer, separated by a layer providing a compressible mechanical shield between the pressure-disclosing layer and the temperature-differential layer, and a support/base protection layer below the temperature-differential layer, said support/base protection layer being provided with anchoring points, wherein the visual confirmation of the impact or pressure differential appears in the pressure-disclosing layer directly at the point where the impact or pressure differential occurred.

13. Equipment for detecting and providing visual confirmation of an impact thereon or of a pressure differential which comprises an article having a sandwich construction with a protective layer, a pressure-disclosing layer beneath said protective layer, said pressure disclosing layer further comprising a liquid crystal, or other thermochromic material, a temperature-differential layer separated by a layer providing a compressible mechanical shield between the pressure-disclosing layer and the temperature-differential layer, and a support/base protection layer below the temperature-differential layer, wherein the visual confirmation of the impact or pressure differential appears in the pressure-disclosing layer directly at the point where the impact or pressure differential occurred.

14. Equipment as claimed in claim 13, further comprising an adhesive layer below the support/base layer.

15. Equipment as claimed in claim 13, wherein the support/base protection layer is provided with anchoring points.

* * * * *